United States Patent [19]

Lange

[11] E Re. 28,571

[45] Reissued Oct. 14, 1975

[54] ATTENUATED LIGHT COUPLING BETWEEN SCINTILLATION AND PHOTOMULTIPLIER

[75] Inventor: Kai Lange, Copenhagen, Denmark

[73] Assignee: General Electric Company, Waukesha, Wis.

[22] Filed: Feb. 25, 1974

[21] Appl. No.: 445,679

Related U.S. Patent Documents

Reissue of:

[64] Patent No.: 3,774,032
Issued: Nov. 20, 1973
Appl. No.: 191,891
Filed: Oct. 22, 1971

[30] Foreign Application Priority Data

Nov. 19, 1970 Denmark ..... 5885/70

[52] U.S. Cl. ..... 250/366; 250/368; 250/514; 250/227

[51] Int. Cl. ..... G01t 1/20

[58] Field of Search ..... 250/366, 368, 514, 250/237, 71.5 R, 227

[56] References Cited

UNITED STATES PATENTS

| | | | |
|---|---|---|---|
| 2,822,479 | 2/1958 | Goldsworthy | 250/71.5 R |
| 3,011,057 | 11/1961 | Anger | 250/71.5 R |
| 3,110,816 | 11/1963 | Kaisler et al. | 250/71.5 R |
| 3,265,892 | 8/1966 | Sheldon | 250/71.5 R |
| 3,683,180 | 8/1972 | Martone et al. | 250/71.5 R |
| 3,774,032 | 11/1973 | Lange | 250/366 |
| 3,784,819 | 1/1974 | Martone et al. | 250/366 |

*Primary Examiner*—Harold A. Dixon

[57] ABSTRACT

A radiation image device having a scintillator, a plurality of photomultiplier tubes positioned to receive light from the scintillator and a light conductor between the scintillator and the photomultiplier tubes. Dimming means are positioned between the scintillator and photomultiplier tubes.

8 Claims, 2 Drawing Figures

ATTENUATED LIGHT COUPLING BETWEEN SCINTILLATION AND PHOTOMULTIPLIER

Matter enclosed in heavy brackets [ ] appears in the original patent but forms no part of this reissue specification; matter printed in italics indicates the additions made by reissue.

SUMMARY OF THE INVENTION

The present invention relates to a radiation image device and in particular to means for increasing the sensitivity uniformity of such a device.

One purpose is a radiation image device in which a plurality of opaque areas or light dimming areas are positioned between the scintillator and the photomultiplier tubes to reduce variations in the total output from the photomultiplier tubes as a function of light position.

Another purpose is a radiation image device of the type described which has improved resolution and sensitivity uniformity.

Another purpose is a reliably operable relatively inexpensive means for increasing sensitivity uniformity in a radiation image device.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention relates to a radiation image device of the general type shown in U.S. Pat. No. 3,011,057 in which collimator directed radiation from a radioactive body strikes a scintillating crystal which emits visible light to a plurality of photomultiplier tubes. The photomultiplier tubes in turn, through the use of various types of electronic circuitry, can be used to provide an image of the radiation received by the scintillator. Although the photomultiplier tubes are positioned adjacent one another, because they are round in cross section, there are necessarily spaces between adjacent tubes. Light emitted beneath a space between photomultiplier tubes does not cause the same amplitude electric signal in the total output of all photomultiplier tubes, as does light emitted directly beneath one of the photomultiplier tubes. The result is a variation in the sensitivity of the instrument or camera which is undesirable in that the total output signal from the photomultiplier tubes varies as a function of the position of the emitted light relative to the tubes.

Various means have been proposed in the prior art to overcome this sensitivity problem. For example, it has been proposed to manufacture the photomultiplier tubes in a hexagonal shape to reduce or essentially eliminate the space between tubes. However, manufacturing considerations have prevented such an arrangement from becoming a commercial reality. Various forms of mirrors have been placed in the area between photomultiplier tubes so that any light emitted beneath a space between the tubes will be directed toward the tubes. However, such a mirror arrangement increases the thickness of the light conductor between the scintillator and phototubes to the point where resolution of the image device is affected. The present invention not only improves sensitivity uniformity, but also improves resolution of the image device by decreasing the thickness of the light conductor.

Figure 1:
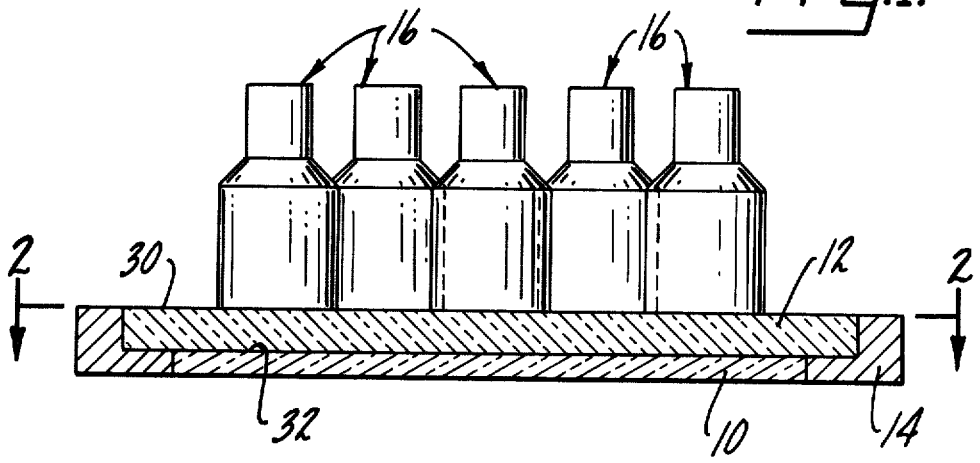
FIG. 1 is a diagrammatic illustration of a radiation image device of the type described.
Figure 2:
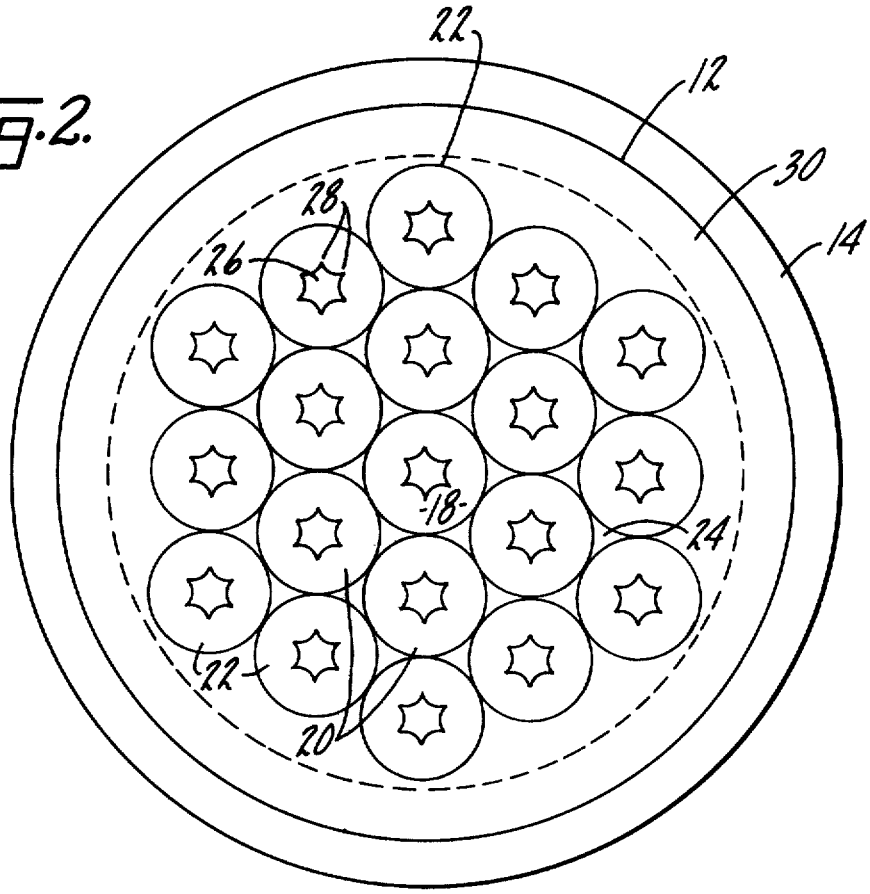
FIG. 2 is a section along plane 2—2 of FIG. 1.

In FIG. 1, a scintillating crystal of a known type is indicated at 10 and a light conductor is indicated at 12. For example, the light conductor 12 may be made of quartz glass or a similar light conductive material. A holder 14 may conveniently position the scintillator 10 and the light conductor 12 relative to each other. A plurality of phototubes are indicated diagrammatically at 16, with each of the phototubes being arranged to provide a stream of electrons in response to light striking their photo cathodes. The phototubes 16 may be arranged in a variety of arrays, and one satisfactory arrangement is to have 19 such tubes, as indicated in FIG. 2. There is a central phototube 18 surrounded by a first ring of six tubes 20 and a second ring of 12 tubes 22. With such an arrangement and appropriate electronic circuitry it is possible to precisely locate each light emission relative to X and Y axes drawn through the central tube 18. The above-mentioned U.S. Pat. No. 3,011,057 shows one form of circuitry which has been found to be satisfactory for giving the X and Y coordinate position of any particular light emission from the scintillator 10.

A light emission at any location on the scintillator 10 will cause a signal to be emitted from of the phototubes 16. The particular position of the light emission will cause signals of varying strength to be emitted from different phototubes and it is the variation in signal strength from each of the phototubes which enables the electronic circuitry to locate the light emission relative to X and Y coordinates. It has been found, however, that the sensitivity uniformity of the above-described arrangement is less than satisfactory due to the fact that a light emission directly beneath a space 24 between adjacent phototubes provides a total signal strength from all of the phototubes less than that caused by a light emission directly beneath any one of the phototubes. This variation in signal strength as a function of the position of the light emission decreases the sensitivity uniformity of the instrument. As indicated above, a desirable result is to have the total signal strength from all phototubes the same regardless of the position of the light emission, assuming that the light emissions are equal in intensity.

An opaque area or light dimming area 26 is positioned in general axial alignment with each of the phototubes 16, as indicated in FIG. 2. The opaque areas 26 prevent a selected amount of the light from each light emission on the scintillator from reaching each of the phototubes. By reducing the amount of light reaching each tube, or by reducing the active area of the photocathode of each of the photomultiplier tubes, the sensitivity uniformity of the instrument is increased as the total signal derived from any light emission is generally the same, regardless of whether the light emission is from a space between phototubes or directly under one of the phototubes.

As indicated in FIG. 2, the opaque area or dimming area 26 may take on the shape of a star with each of the points of the star indicated at 28 being directed toward the axis of an adjacent photomultiplier tube. This particular configuration for the light dimming area is the most desirable from the standpoint of increasing sensitivity uniformity. As a practical application, it has been found that a spot, round in configuration, will provide satisfactory results. In like manner, it has also been determined that the opaque area or the area of the photocathode which is rendered inactive does not have to be a single spot, but can be a plurality of spots. The particular shape of the spot, the number of spots or areas for each photomultiplier tube can vary. What is important is to reduce the active area of the photocathode of each photomultiplier tube to the point where the total signal from all photomultiplier tubes for any light emission is, as close as possible, the same, regardless of the particular position of the light emission on the scintillator. In some applications each area 26 may not be totally opaque, but may only reduce the amount of light transmitted.

The dimming or opaque areas 26 may be placed on the surface 30 of the light conductor 12, which is directly adjacent the photomultiplier tubes 16. It has also been found satisfactory to place the dimming areas on the surface 32 between the light conductor 12 and the scintillator 10. In practice, it is preferable to have the dimming areas as close as possible to the photocathodes.

Two of the most important parameters for an instrument of the type described are resolution and sensitivity. By having an extremely thin light conductor or light pipe, the resolution of the instrument is improved, but sensitivity uniformity suffers. In like manner, by having a thick light conductor, the sensitivity uniformity of the instrument is substantially increased but the resolution decreases. The present arrangement of providing opaque areas or of making inactive certain areas of the photocathodes of each of the photomultiplier tubes, makes it possible to obtain improved resolution and improved sensitivity uniformity.

As indicated above, the precise shape of the opaque areas, or light dimming areas, can vary, as can the position of such areas. Not only is it possible to place the opaque areas on either side of the light conductor 12, but in some applications the photocathode may be rendered inactive within the photomultiplier tube itself.

Whereas the preferred form of the invention has been shown and described herein, it should be realized that there may be many modifications, substitutions and alterations thereto.

I claim:

1. In a radiation image device having a scintillator, means for emitting electrons in response to light from said scintillator, and light conductive means between the scintillator and electron emitting means, the improvement comprising means on either the light conductive means or the electron emitting means and between the scintillator and the electron emitting means for selectively attenuating the light emitted by said scintillator.

2. In a radiation image device having a scintillator, a plurality of photomultiplier tubes positioned to receive light from the scintillator, and light conductive means between the scintillator and the photomultiplier tubes, the improvement comprising means on either the light conductive means or the photomultiplier tube for selectively attenuating the light emitted by the scintillator which is received by the photomultiplier tubes.

3. The structure of claim 2 further characterized in that the means for attenuating the light received by the photomultiplier tubes includes a plurality of opaque areas positioned on a surface of the light conductive means.

4. The structure of claim 3 further characterized in that said opaque areas are positioned on that surface of the light conductive means nearest the photomultiplier tubes.

5. The structure of claim 3 further characterized in that said opaque areas are each in alignment with a photomultiplier tube.

6. The structure of claim 5 further characterized in that there is at least one opaque area in general axial alignment with each photomultiplier tube.

7. The structure of claim 6 further characterized in that each opaque area is located generally in the center of each photomultiplier tube.

8. The structure of claim 7 further characterized in that each of said opaque areas are generally the same in size and configuration.

* * * * *

Disclaimer

Reissue No. 28,571.—*Kai Lange*, Copenhagen, Denmark. ATTENUATED LIGHT COUPLING BETWEEN SCINTILLATION AND PHOTOMULTIPLIER. Patent dated Oct. 14, 1975. Disclaimer filed Oct. 13, 1977, by the assignee, *General Electric Company*.

Hereby enters this disclaimer to claims 1 to 8, inclusive, of said patent.

[*Official Gazette February 28, 1978.*]